United States Patent [19]

Nakatsuyama et al.

[11] Patent Number: 4,656,617
[45] Date of Patent: Apr. 7, 1987

[54] START-CONTROL METHOD AND CIRCUIT FOR OPTICAL DISC PLAY-BACK SYSTEM

[75] Inventors: Takashi Nakatsuyama, Chiba; Akashi Ito, Tokyo, both of Japan

[73] Assignee: Sony Corporation, Tokyo, Japan

[21] Appl. No.: 730,542

[22] Filed: May 6, 1985

[30] Foreign Application Priority Data

May 8, 1984 [JP] Japan ................................. 59-90158

[51] Int. Cl.$^4$ .............................................. G11B 7/08
[52] U.S. Cl. ......................................... 369/45; 369/46
[58] Field of Search ....................... 369/44, 45, 46, 50, 369/239; 360/73

[56] References Cited

U.S. PATENT DOCUMENTS 4,475,182 10/1984 Hosaka .................................. 369/45
4,539,667 9/1985 Fujiie ..................................... 369/50
4,544,837 10/1985 Tanaka et al. ..................... 369/45 X Primary Examiner—Aristotelis M. Psitos

[57] ABSTRACT

Start-control method and circuit for an optical disc play-back system according to this invention can allow the starting current of the system to be reduced considerably. The method includes the steps of loading the disc onto a disc drive motor, then finding the focal position of the lens, then powerfully energizing the disc drive motor for a certain period of time so as to start the disc spinning and then energizing the focus- and the tracking-servo circuits during inertial rotation of the disc drive motor. The circuit includes a disc-drive-motor servo switch capable of switching the power supply for the disc drive motor from the kick circuit to the disc-drive-motor servo circuit, a focus servo switch capable of switching the power supply for the focus servomotor from the focus search circuit to the focus servo circuit, and a tracking servo switch capable of initiating power supply to the tracking servomotor.

5 Claims, 3 Drawing Figures

START-CONTROL METHOD AND CIRCUIT FOR OPTICAL DISC PLAY-BACK SYSTEM

BACKGROUND OF THE INVENTION

This invention relates to a start-control method and circuit for an optical disc play-back system and particularly useful for battery-driven optical disc play-back systems.

Generally, compact optical audiodisc players, one kind of optical disc play-back system, exhibits reproduction properties considerably superior to those of conventional, phonographic audiodisc players. These optical audiodisc players include complicated servomechanisms suitable for accurate bit-wise retrieval of information stored on an optical disc and consumes a great deal of electrical power. This high rate of consumption of electrical power is chiefly due to the fact that the search current used in focus search operations and various other currents are used in addition to the starting current for the disc drive motor, resulting in the need for a high-power electrical supply.

Accordingly, a battery-driven optical disc player generally requires a battery capable of supplying the significant electrical power needed to start the motors, which in turn considerably reduces the service life of the battery. On the other hand, the use of a battery with a large capacity increases the weight of the battery, thus making it difficult to achieve a compact and light optical disc player.

SUMMARY OF THE INVENTION

The object of this invention is to provide an improved start-control method and circuit for an optical disc play-back system with a significantly reduced starting current.

In order to fulfill the above-mentioned and other object, a start-control method, according to the present invention, is applicable to an optical disc play-back system which comprises an optical disc with information tracks to be read, a disc drive motor which rotates the optical disc, an objective lens facing the information tracks, a photoelectric sensor which receives a beam of reflected light from the surface of the optical disc through the lens, a focus servomotor which moves the lens in a direction normal to the surface of the optical disc, a tracking servomotor which moves the lens radially across the optical disc, a drive circuit for starting the disc drive motor, a focus search circuit, a focus servo circuit, a tracking servo circuit, a disc-drive-motor servo circuit with a phase locked loop for regulating the speed of the disc drive motor to a rated level, and means for generating control signals for the photoelectric sensor, the focus servo circuit, the tracking servo circuit and the disc-drive-motor servo circuit. The method comprises the steps of loading the optical disc onto a turntable driven by the disc drive motor, then, energizing the disc drive motor for a certain period of time so as to rotate the optical disc, after the certain period of time operating the focus-servo circuit to establish a focused laser beam on the disc and next operating the tracking-servo circuits to establish the focused beam on one track of the disc while the disc drive motor continues to turn due to the force of inertia.

In addition, a start-control circuit comprises a disc-drive-motor switch capable of switching the power supply for the disc drive motor from the drive circuit to the disc-drive-motor servo circuit, a focus servo switch capable of switching the power supply for the focus servomotor from the focus search circuit to the focus servo circuit, and a tracking servo switch capable of switching the power supply for the tracking servomotor, the focus and tracking servo-switches being operated during the inertial rotation of the disc drive motor.

The start-control method and circuit of this invention requires only a drive current for starting the disc drive motor and rotating an optical disc and obviates the need of a focus-search current and other controlling currents when the disc drive motor is begun to rotate so that the peak value of the starting current of the optical disc play-back system can be considerably reduced. Thus, a compact and light battery of low capacity and long service life can supply sufficient electrical power to an optical disc player.

BRIEF DESCRIPTION OF THE DRAWINGS

The present invention will be understood more fully from the detailed description given herebelow and from the accompanying drawings of the preferred embodiment of the invention, which however, should no be taken to limit the invention to the specific embodiment, but are for explanation and understanding only.

In the drawings.

DESCRIPTION OF THE PREFERRED EMBODIMENT

The preferred embodiment of this invention will be described in detail with reference to FIGS. 1 to 3.

Figure 1:
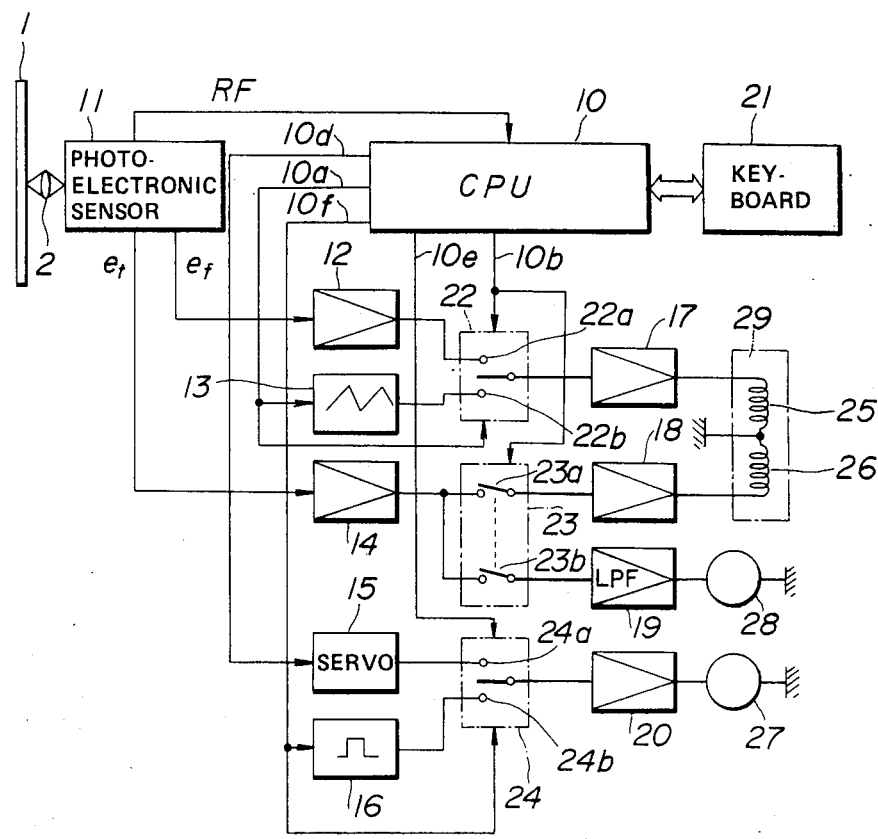
FIG. 1 is a block diagram of a start-control circuit for an optical disc play-back system according to this invention.

As shown in FIG. 1, a start-control circuit of this invention comprises a CPU (i.e. central processing unit) 10, an optical pickup 11 including a laser diode and a photoelectronic sensor opposing an optical disc 1, a first pre-amplifier 12 for a focus error signal $e_f$ a focus search signal generator 13, a second pre-amplifier 14 for a tracking error signal $e_t$, a disc-drive-motor servo circuit with a phase locked loop 15, a drive signal generator 16 for the disc drive motor 27, a first main amplifier 17 for the focus error signal $e_f$ or a focus search signal, a second main amplifier 18 for the trackingerror signal $e_t$, a third integral-type main amplifier 19 for the tracking error signal $e_t$, a fourth main amplifier 20 for either the output of the disc-drive-motor servo circuit 15 or a kick signal, a keyboard 21, a focus servo switch 22, a tracking servo switch 23, a disc-drive-motor switch 24, a voice coil type focus servomotor 25 to move an objective lens 2 for focussing, a tracking servomotor 26 for tracking, the latter two servomotors constituting an actuator 29, which is disclosed in U.S. Pat. No. 4,473,274, for an objective lens 2, a disc drive motor 27, and a feed motor 28 for the optical pickup.

The photoelectronic sensor, mounted on the optical pickup 11, not shown, receives three beams of reflected light from the optical disc 1 through the objective lens 2, also movably mounted on the optical pickup, and sends the RF signal, the focus error signal $e_f$ and the tracking error signal $e_t$ respectively to the CPU 10, the first pre-amplifier 12 and the second pre-amplifier 14.

Figure 2:
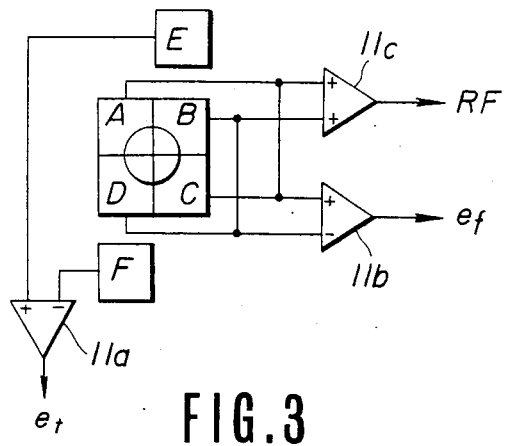
FIG. 2 is a circuit diagram of a photoelectric sensor of FIG. 1.

The photoelectronic sensor, as shown in FIG. 2, comprises an array of light-receiving elements A, B, C and D, and light-receiving elements E and F, all of these elements are isolated to each other. Outputs A and C of the light-receiving elements A and C are concurrently applied to a positive input terminal of a first differential amplifier 11b and to one positive input terminal of an adder 11c. Outputs B and D of the light-receiving elements B and D are concurrently applied to a negative input terminal of the first differential amplifier 11b and to the other positive input terminal of the adder 11c. An output E of the light-receiving element E is applied to a positive input terminal of a second differential amplifier 11a and an output F of the light-receiving element F is applied to a negative input terminal of the second differential amplifier 11a. The output signal of the adder 11c represents the RF signal. The output signal of the first differential amplifier represents the focus error signal $e_f$. The output signal of the second differential amplifier represents the tracking error signal $e_t$.

An output of the first pre-amplifier 12 is applied to the first main amplifier 17 through one contact 22a of the focus servo switch 22 and an output of the focus search signal generator 13 is applied to the first main amplifier 17 through the other contact 22b of the focus servo switch 22. A signal on a first control line 10a from the CPU 10 operates the focus search signal generator 13 and connects the latter to the first main amplifier 17. A signal on a second control line 10b from the CPU 10 connects the first amplifier 17 through the first contact 22a of the focus servo switch 22 and closes both contacts 23a and 23b of the tracking servo switch 23.

The output signal of the first main amplifier 17 is supplied to the focus servomotor 25 which drives the objective lens 2 in the direction normal to the surface of the optical disc 1.

The output of the second pre-amplifier 14 is concurrently applied to the second main amplifier 18 through the contact 23a of the tracking servo switch 23 and to the third main amplifier 19 through the contact 23b of the tracking servo switch 23. The contacts 23a and 23b are interlocked. The ouput signal of the second main amplifier 18 is supplied to the tracking servomotor 26 which can finely position the objective lens 2 radially across the optical disc 1 so a focussed laser beam as to impinge upon a one track of the optical disc. The output of the third main amplifier 19 drives the pickup feed motor 28.

The disc-drive-motor servo circuit 15 receives a clock signal on a fourth control line 10d from the CPU 10. A signal on a fifth control line 10e from the CPU 10 closes the circuit through the contact 24a.

The drive signal generator 16 receives a signal on a sixth control line 10f from the CPU 10 and sends a drive signal, the duration of which is about 0.5 to 1.0s, to the fourth main amplifier 20 through the other contact 24b of the disc-drive-motor servo switch 24. The signal on the sixth control line 10f concurrently drives the drive signal generator 16 and closes the circuit through the other contact 24b of the disc-drive-motor servo switch 24.

At first, loading the optical disc 1 onto the turn table, a chucking means fixes the optical disc 1 on the turntable and then the pickup feed motor 28 moves the optical pickup 11 to a predetermined place within an inner area of the optical disc 1.

Next, the CPU 10 outputs a signal over the sixth control line 10f. This signal orders the drive signal generator 16 to output a drive signal and concurrently closes the contact 24b of the disc-drive-motor switch 24. The fourth main amplifier 20 receives the drive signal and rotates the disc drive motor 27. Thus, the disc drive motor 27 rotates for the predetermined duration of the drive signal, i.e. about 0.5 to 1.0s. After this, the contact 24b is opened but the disc drive motor 27 and the optical disc 1 continue to turn due to the force of inertia.

Then after the predetermined duration, the CPU 10 outputs a signal over the first control ine 10a. This signal closes the contact 22b of the focus servo switch 22 and concurrently operates the focus search signal generator 13 to output a focus search signal. The first main amplitude 17 receives the focus search signal and energizes the focus servomotor 25 to drive the objective lens 2 from one limited position toward another limitted position in direction normal to the surface of the optical disc 1. The CPU 10 recognizes the level of the focus error signal $e_f$ to be zero and the level of the RF signal exceeds a predetermined level corresponding to the zero level of the focus error signal $e_f$, due to focussing movement of the objective lens 2. Then, the CPU 10 stops the signal on the first control line 10a so as to stop the focus servo signal generator 13 and to open the contact 22b of the focus servo switch 22 and outputs a signal over the second control line 10b so as to close the contact 22a of the focus servo switch 22 and both contacts 23a and 23b of the tracking servo switch 23. Accordingly, the first main amplifier 17 is connected to the first pre-amplifier 12 to establish a focus servo circuit and the second and third main amplifiers 18 and 19 are both connected to the second pre-amplifier 14 to establish a tracking servo circuit.

Subsequently, the CPU 10 closes the contact 24a of the disc-drive-motor switch 24 by outputting a signal over the fifth control line 10e to establish a disc-drive-motor servo circkuit for the disc drive motor 27.

The disc drive motor 27 is switched from its inertial rotation state described above to tis electric powered rotation state by the drive signal generator 16 till the rotational speed of the disc is within the lock range of the phase locked loop, and after then switched to electric powered rotation state by the disc drive motor servo circuit 15.

Figure 3:
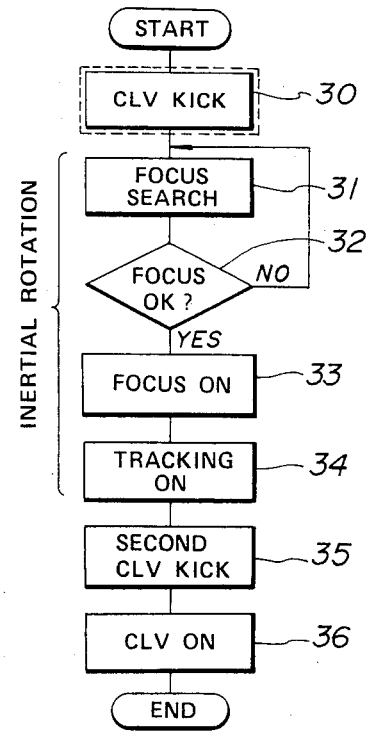
FIG. 3 is a flowchart representative of a start-control method for an optical disc play-back system according to this invention.

The flowchart of FIG. 3 illustrates a start-control method for the optical disc play-back system according to this invention. At a CLV (i.e. Constant Linear Velocity) drive frame 30, the disc drive motor 27, upon receiving the drive signal, is rotated i.e. a relatively speed rotation, to rotate the optical disc 1 for the duration of the drive signal. Then, the optical disc 1 continues to rotate by the force of inertia during which a focus-search frame 31, a focus-check frame 32, a focus-on frame 33 and a tracking-on frame 34 are completed. In a second CLV drive frame 35, the disc drive motor 27 is driven again to increase the rotational speed of the optical disc within a range of the lock rage of the phase locked loop thereof. In the focus-on frame 33, the focus servo circuit is established, in the tracking-on frame 34, the tracking servo circuit is established and in a CLV-on frame 36 subsequent to the second CLV drive frame 35, the disc-drive-motor servo circuit is established.

What is claimed is:

1. A start-control method for an optical disc play-back system comprising an optical disc with an information track to be read, a disc drive motor which rotates the optical disc, an objective lens facing the information track, a photoelectric sensor which receives a beam of reflected light from the surface of the optical disc through the lens, a focus servomotor which drives the lens in a direction normal to the surface of the optical disc, a tracking servomotor which moves the lens radially across the optical disc, a drive circuit for starting the disc drive motor, a focus search circuit, a focus servo circuit, a tracking servo circuit, a disc-drive-motor servo circuit for regulating the speed of the disc drive motor at a rated level, and means for generating control signals for the focus servo circuit, the tracking servo circuit and the disc-drive-motor servo circuit characterized in that the method comprises the steps of:

energizing the disc drive motor for a certain period of time;

establishing at least the focus search circuit while the disc drive motor continues to rotate due to the force of inertia.

2. A start-control method as recited in claim 1, characterized in that said establishing step is performed when an RF signal from the photoelectric sensor matches or exceeds a signal representing a zero-focus error signal from the photoelectric sensor to the focus servo circuit.

3. A start-control method as recited in claim 1, characterized in that the method further comprises the steps of:

energizing the disc motor a second time so as to accelerate its rotation to the rated level after said establishing step; and then establising the disc-drive-motor servo circuit.

4. A start-control circuit for an optical disc play-back system comprising an optical disc with an information track to be read, a disc drive motor for rotating the optical disc, an objective lens facing the information track, a photoelectric sensor which receives a beam of reflected light from the surface of the optical disc through the lens, a focus servomotor which drives the lens in a direction normal to the surface of the optical disc, a tracking servomotor which drives the lens radially across the optical disc, a drive circuit for starting the disc drive motor, a focus search cirkcuit, a focus servo circuit, a tracking servo circuit, a disc-drive-motor servo circuit for regulating the speed of the disc drive motor to a rated level, and means for generating control signals for the focus servo circuit, the tracking servo circuit and the disc-drive-motor servo circuit characterized in that said start-control circuit comprises a disc-drive-motor switch capable of switching the power supply for the disc drive motor from the drive circuit to the disc-drive-motor servo circuit and back, the drive circuit energizing the disc drive motor for a certain period of time, a focus servo switch capable of switching the power supply for the focus servomotor from the focus search circuit to the focus servo circuit and back, and a tracking servo switch capable of supplying a tracking error signal to the tracking servomotor, and means for switching the focus servo switch to connect the focus search circuit with the focus servomotor and operating the focus search circuit while the disc drive motor rotating due to the force of inertia after the disc drive motor driven through the drive circuit for the certain period of time.

5. A start-control circuit as recited in claim 5, characterized in that the drive circuit energizes the disc drive motor for about 0.5 to 1.0s.

* * * * *